United States Patent [19]

Pop et al.

[11] 4,361,502
[45] Nov. 30, 1982

[54] CATALYST FOR THE PYROLYSIS OF HYDROCARBONS

[75] Inventors: Grigore Pop, Ploiesti; Gheorghe Ivanus, Bucharest; Silvia Boteanu, Pitesti; Pavel Tomi; Ecaterina Pop, both of Ploiesti, all of Romania

[73] Assignee: Institutul de Inginerie Tehnologica Si Proiectari Pentru Industria Chimica - IITPIC, Bucharest, Romania

[21] Appl. No.: 25,541

[22] Filed: Mar. 30, 1979

Related U.S. Application Data

[62] Division of Ser. No. 857,922, Dec. 6, 1977, Pat. No. 4,172,816.

[30] Foreign Application Priority Data

Dec. 7, 1976 [RO] Romania .................................. 88658

[51] Int. Cl.$^3$ ............................................. B01J 29/20
[52] U.S. Cl. ................................................. 252/455 Z
[58] Field of Search ..................... 252/455 Z; 208/120

[56] References Cited

U.S. PATENT DOCUMENTS

| | | | |
|---|---|---|---|
| 3,013,982 | 12/1961 | Breck et al. ...................... | 252/455 Z |
| 3,207,701 | 9/1965 | Curtin .............................. | 252/455 Z |
| 3,236,762 | 2/1966 | Rabo et al. ...................... | 252/455 Z |
| 3,444,253 | 5/1969 | Reimlinger et al. ............ | 252/455 Z |
| 3,823,092 | 7/1974 | Gladrow .......................... | 252/455 Z |
| 3,835,032 | 9/1974 | Dolbear et al. ................. | 208/120 |

*Primary Examiner*—Carl F. Dees
*Attorney, Agent, or Firm*—Karl F. Ross

[57] ABSTRACT

A catalyst, for the catalytic pyrolysis of hydrocarbons to olefins and diolefins at temperatures in the range of 600°–750° C. and pressures of 0.1 to 20 atmospheres, is a bifunctional synthetic modified mordenite zeolite of the formula $(yH.zM.uNa)\,O.Al_2O_3.SiO_2$ wherein M is Cu, Ag or Co/2 and $u+y+z$ approach or equal 2. Good yields of ethylene and propylene are obtained from hydrocarbon feedstocks having boiling points up to 550° C.

5 Claims, No Drawings

CATALYST FOR THE PYROLYSIS OF HYDROCARBONS

CROSS REFERENCE TO RELATED APPLICATIONS

This application is a divisional of Ser. No. 857,922 filed Dec. 6, 1977 now U.S. Pat. No. 4,172,816.

FIELD OF THE INVENTION

This invention relates to catalysts and more particularly to the use of a specific bifunctional catalyst for obtaining lower olefins by hydrocarbon pyrolysis.

BACKGROUND OF THE INVENTION

Ethylene and partly propylene, butenes, butadiene and isoprene are obtained, at present, by the pyrolysis, in the presence of water vapor, of lower paraffins (ethane, propane, butane) or of low boiling hydrocarbon cuts such as straight run gasoline with reduced content of aromatic hydrocarbons.

The shortage of these raw materials in the past few years has made it desirable to use the heavy cuts of hydrocarbons, namely gas oils, vacuum distillates or crude oil as the pyrolysis feedstock.

As shown in Table 1, depending on the oil cut used, the yields obtained are different, (M.I. Offer, Hydrocarbon Processing 55 No. 10, Oct. 1976, p. 123).

TABLE 1

Distribution of products from cracking of the hydrocarbon cuts with water vapor.

| Cut Distilling range °C. Pyrolysis severity | Gasoline 32-171 | | Gas Oil DA 232-327 | | Gas Oil DAV 343-546 | |
|---|---|---|---|---|---|---|
| | Low | High | Low | High | Low | High |
| $CH_4$ | 10.3 | 15.0 | 8.0 | 13.7 | 6.0 | 9.1 |
| $C_2H_4$ | 25.8 | 31.3 | 19.5 | 26.0 | 16.0 | 19.0 |
| $C_2H_6$ | 3.3 | 3.4 | 3.3 | 3.0 | 3.2 | 3.8 |
| $C_3H_6$ | 16.0 | 12.1 | 14.0 | 9.0 | 12.5 | 12.2 |
| 1.3-$C_4H_6$ | 4.5 | 4.2 | 4.5 | 4.2 | 4.5 | 4.9 |
| Other $C_4$ hydrocarbons | 7.9 | 2.8 | 6.4 | 2.0 | 5.4 | 3.4 |
| $C_5$ cut-205° C. | 27.0 | 22.0 | 20.0 | 20.0 | 14.0 | 11.0 |
| Fuel Oil | 3.0 | 6.0 | 21.0 | 19.0 | 31.0 | 32.0 |
| Other components | 2.2 | 3.2 | 3.3 | 3.1 | 7.0 | 4.6 |

Crude oil cracking in the presence of water vapor at very high temperatures (Japan Pat. No. 48-10763.1973) was recently tested on an industrial scale. The results obtained are given in Table 2.

TABLE 2

Crude oil pyrolysis by Kureha-Union Carbide process.

| | Crude oil from | | | |
|---|---|---|---|---|
| Feed | Syria | Minas | Aramco | Kafuji |
| 0 | 1 | 2 | 3 | 4 |
| Specific weight (g/cm²) | 0.840 | | | |
| | 0.840 | 0.844 | 0.853 | 0.880 |
| Gasoline up to 200° | 40 | 16 | 32 | 27 |
| Oil (220–250° C.) % wt | 20 | 8 | 12 | 8 |
| Gas oil (250–350° C.) % wt | 15 | 10 | 10 | 10 |
| Waste oil % wt. | 25 | 66 | 46 | 55 |
| Sulfur | 0.07 | 0.07 | 1.72 | 2.92 |
| Working conditions: | | | | |
| Steam temperature (°C.) | 1650 | 1450 | 2000 | 1650 |
| Gravimetric ratio of water to crude oil | 2.6 | 3.2 | 2.8 | 2.6 |
| Reaction time (seconds) | 0.01 | 0.01 | 0.005 | 0.01 |
| Products (% wt.) | | | | |
| $CH_4$ | 7.7 | 5.1 | 13.7 | 7.8 |
| $C_2H_2$ | 1.4 | 1.1 | 17.7 | 1.6 |
| $C_2H_4$ | 26.2 | 29.4 | 18.6 | 25.2 |
| $C_3H_6$ | 9.5 | 11.2 | 0.7 | 8.7 |
| $C_4H_6$ | 3.4 | 3.7 | 0.5 | 2.8 |
| $H_2 + C_3-C_4$ cut | 12.8 | 5.5 | 8.8 | 7.8 |
| Benzene cut; boiling temp. cut 200° C. | 2 | 1 | 5 | 1 |
| Naphthene cut; boiling temp. cut 200-250° C. | 12 | 11 | 4 | 10 |
| Heavy cut 250–450° C. | 15 | 20 | 6 | 15 |
| Waste cut; boiling temp. cut > 450° C. | 10 | 12 | 25 | 20 |

The disadvantages of vapor cracking of heavy crude oil cuts are mainly the large amount of waste fuel and from the relatively low yields of $C_2$-$C_4$ olefins. Improvements in this field can be obtained if the process is performed in the presence of thermal carriers (coke, silica, refractory oxides) preferably in a fluidized bed or mobile bed of a thermal carrier. A synthesis of these processes is described by R. Chelle and G. Henrich (Chimie et Industrie, Genie Chimique vol. 104, No. 4-5 March 1971, p, 413–421).

Up to the present these processes have not been developed on an industrial scale due to the fact that they require high reaction temperatures within the operation range of cracking units with water vapor; the mechanical corrosion of reactors is an important deterrent.

Recently, starting from these processes, the catalytic processes of hydrocarbon pyrolysis have been tried.

According to West German Pat. No. 1,927,061, the pyrolysis reaction is achieved on catalysts consisting of Mg and Zr oxide mixtures, with lanthanide admixtures, $Fe_2O_3$, $Al_2O_3$, $SiO_2$ or Ca, Mg, Sr and Ba oxides. Alternative catalysts based on refractory metal oxide are described in the following patents West German Pat. No. 1,971,400, England Pat. No. 1,369,242, France Pat. No. 1,603,019, U.S. Pat. Nos. 3,725,495 and 3,767,567, Japan Pat. No. 7,504,002. Also according to the Soviet Union Pat. No. 410,073, the use of potassium niobiate as a catalyst has the advantage of reducing the coke evolved in the process. At present niobium is not available in large amounts for such use.

All these catalysts have the disadvantage that they work at high temperatures, up to 900° C., within the range of thermal processes.

Hence it is difficult to emphasize the catalytic contribution to the pyrolysis process and to estimate the difference between these processes and the process with thermal carriers.

A catalyst working at relatively low temperatures (500°–700° C.) consisting of fluorinated alumina is claimed in the West German Pat. No. 1,277,842. Hydrocarbon cuts from $C_4$ to cuts having boiling temperatures of 450° C. can be used as the pyrolysis feedstock.

It is a specific object of the process mentioned above to obtain propylene as the main product, the ratio of propylene to ethylene being higher than 1 and it provides a high content of aromatic hydrocarbons in the liquid cut from the pyrolysis. The low ethylene yields cannot be improved by recycling the liquid pyrolysis cut due to its aromatic nature. Fluorine also causes instability and corrosion in the apparatus.

The use of new types of catalysts, completely cationized molecular sieves with a ratio of $SiO_2$ to $Al_2O_3$ within the range 3 and 20, is described in U.S. Pat. No. 3,647,682. The relative low thermal stability of these molecular sieves makes it possible to use them at relatively low temperatures and to obtain mainly propylene and saturated hydrocarbons $C_2$ and $C_3$ hydrocarbons.

THE INVENTION

The catalyst for obtaining lower olefins according to the present invention eliminates the disadvantages of conventional catalysts by its use as a specific bifunctional catalyst based on a mordenite zeolite synthetic aluminosilicate with ratios of $SiO_2$ to $Al_2O_3$ higher than 20, in accordance with the formula: $(yH.zM.uNa.)O.Al_2O_3.nSiO_2$: where $y+z+u \leq 2$ M is Cu, Ag or Co/2, n is a number more than 20 and preferably is about 25.

To this may be added v $RO_x$ by adsorption of cocrystallization: R is lead or cerium rare earth or other metal having a large ion radius, v is 0.005 to 0.5 wt. % of the mordenite zeolite aluminosilicate. In general, catalysts where z is 0.3 and y is 1.6 are preferred. By modifying the basic catalyst with metal oxides having a large ionic radius such as Ce, Pb and rare earth oxides, the amount of coke deposition on the catalyst is reduced without any essential change of the catalytic properties. The modifying oxides have the formula v $RO_x$ where $v=0.005$ to 0.5 wt. % of said aluminosilicate catalyst and x is a value depending upon the valence of the metal R.

The high activity peculiar to this catalyst as well as its high thermal stability makes it possible to use it at temperatures of 600°–750° C., well within the temperatures commonly used for both the catalytic cracking and pyrolysis processes. This makes possible the use in reactor design of the rich experience previously acquired from these processes.

Another characteristic of the catalyst is its high flexibility. It is capable of being adjusted to accomodate various raw materials from butane to oil cuts with boiling temperatures above 500° C. Lower olefins and diolefins yields are high and the ratio of the various olefins can be modified within wide limits. The liquid cut consists mainly of gasolines with the boiling range of 50°–205° C., even when heavy oil cuts are used as feedstocks.

Reduced amounts of acetylene, aromatic and isoparaffin hydrocarbons are obtained in the catalytic process, thus simplifying the further separation and purification stages of the reaction products and giving the possibility of recycling the liquid cuts. The consumption of raw material/ton of ethylene can thus be reduced to 2 tons raw material/ton of ethylene. It is surprising that the pressures, up to 20 atmospheres, and the absence of diluents, such as water vapor, do not worsen catalytic performances leading to a further simplification of separation units and to a decrease of the power consumption necessary to compress the resultant gases.

Due to coke deposition the performance of the catalyst of this invention is cyclic. It can be carried out in all known types of reactors, such as those having fixed, mobile or fluidized catalyst beds.

The catalyst is periodically regenerated by controlled burning of the accumulated coke with air or inert gases containing oxygen.

The catalyst may be premixed with heat carriers such as are used in thermal pyrolysis. Among such carriers, corundum ($\alpha$-alumina) is useful and does not interfere with the catalysis or the catalysts of this invention.

Hereinafter are given examples to illustrate but not to limit the procedure.

EXAMPLE 1

Mordenite having the formula $(1.9H.0.1\ Na)O.Al_2O_3.25\ SiO_2$, prepared and decationized by known processes, is modified by ion exchange with Cu, Ag or Co and molded as extrudates with diameter of 1–2 mm. The catalyst is fed into a catalytic reactor of 100 cm³ capacity. Normal butane is steadily passed at a volume speed equal to 750 h⁻¹ over the catalyst heated at 650° C.

The distribution of reaction products obtained is shown in Table 3 and compared to the thermal process without catalyst but in the presence of the heat carrier consisting of $\alpha$-alumina, corundum type, with high thermal conductivity, and of size close to the catalyst sizes.

Under identical working conditions, but in the absence of the thermal carrier, the conversion degree of normal butane is reduced to half.

The comparison data obtained with the monofunctional catalyst No. 1 (consisting of decationized mordenite), and catalysts 2, 3 and 4 show the higher activity of the bifunctional catalysts of this invention.

TABLE 3

| Catalyst Components (% wt) | n - Butane pyrolysis | | | | Thermal process with heat carrier |
|---|---|---|---|---|---|
| | 1 | 2 | 3 | 4 | |
| $H_2$ | 0.10 | 0.05 | 0.06 | 0.04 | 0.08 |
| $CH_4$ | 4.90 | 8.90 | 8.60 | 12.70 | 5.10 |
| $C_2H_4$ | 8.20 | 11.40 | 10.40 | 10.50 | 4.20 |
| $C_2H_6$ | 5.50 | 7.60 | 7.80 | 14.1 | 3.80 |
| $C_3H_6$ | 11.00 | 12.40 | 12.80 | 13.5 | 8.70 |
| $C_3H_8$ | 2.20 | 7.30 | 5.30 | 9.1 | 0.10 |
| $C_4H_8 + C_4H_6$ | 1.70 | 4.10 | 4.4 | 5.3 | 1.1 |
| $C_4H_{10}$ | 66.40 | 48.25 | 50.64 | 34.76 | 76.92 |

$1 = (1.9H.0.1Na).O.Al_2O_3.25SiO_2$
$2 = (1.6H.0.3Cu.0.1Na).O.Al_2O_3.25SiO_2$
$3 = (1.6H.0.3Ag.0.1Na).O.Al_2O_3.25SiO_2$
$4 = (1.6H.0.3Co.0.1Na).O.Al_2O_3.25SiO_2$

EXAMPLE 2

Mix 250 cm³ catalyst 3 from Table 3 with 250 cm³ $\alpha$-alumina and fill a tube reactor of 500 cm³ reaction volume.

Over the catalyst, heated to the medium temperature of 725° C., pass for 2 h. 750 gr n-paraffins $C_9$–$C_{14}$ and 1500 gr water vapor at atmospheric pressure. Initially, the pressure drop in the catalyst bed is 0.28 atmos. At the end of the experiment it amounts to 0.30 atmos. due to coke deposition. Table 4 shows the distribution of the products obtained.

TABLE 4

| | Pyrolysis of n-paraffins on catalyst no. 3 (Table 3) | |
|---|---|---|
| Raw material characteristics: | n-paraffins $C_9$–$C_{14}$ | 99.1% wt |
| | isoparaffins | 0.4% wt |
| | aromatics | 0.5% wt |
| | sulfur (ppm) | 38 |
| | density $D\frac{20}{4}$ | 0.7496 |
| Product distribution (% wt.) | | |
| $H_2$ | | 0.87 |
| $CH_4$ | | 7.93 |
| $C_2H_6$ | | 2.48 |

TABLE 4-continued

Pyrolysis of n-paraffins on catalyst no. 3 (Table 3)

| Raw material characteristics: | | |
|---|---|---|
| | n-paraffins $C_9-C_{14}$ | 99.1% wt |
| | isoparaffins | 0.4% wt |
| | aromatics | 0.5% wt |
| | sulfur (ppm) | 38 |
| | density $D\frac{20}{4}$ | 0.7496 |
| $C_2H_4$ | | 42.13 |
| $C_3H_8$ | | 0.67 |
| $C_3H_6$ | | 18.79 |
| $C_4H_{10}$ | | 0.12 |
| $C_4H_8$ | | 6.79 |
| $1.3 C_4H_6$ | | 5.91 |
| $C_5H_{12}$ | | 0.05 |
| $C_5H_{10}$ | | 0.77 |
| 1.3 iso-$C_5H_8$ | | 1.09 |
| F—$C_6$ cut | | 2.47 |
| n-paraffin $C_7-C_{14}$ | | 6.29 |
| iso-paraffin-olefins | | 1.82 |
| aromatics | | 1.54 |
| carbon oxide (% vol.) | | 0.28 |
| acetylene (ppm) | | 600 |

The amount of coke deposition on catalyst is 0.4%. Catalyst regeneration is achieved by passing an air flow of 300 l/h for 2 hours at 600° C.

EXAMPLE 3

The catalyst in example 2 is modified by deposition thereon of cerium from cerium sulphate. The proportion of is 0.1% wt. of cerium referred to total catalyst weight. Under the conditions given in example 2, the content of coke deposited is 0.2%. Equivalent results are obtained by modifying the catalyst with Pb.

EXAMPLE 4

250 cm³ catalyst with the formula:
$(1.6H.O3Co/2.0.1Na).O.Al_2O_3.25SiO_2 + 0.05Ce_2O_3$
as extrudates with a diameter equal to 2 mm is mixed with 250 cm³ α-alumina and fed into a 500 cm³ reactor. A mixture of water vapors and hydrocarbons is passed over the catalyst heated at medium temperature of 720° C.

Table 5 shows the working conditions, the characteristics of the raw materials and the distribution of the reaction products.

TABLE 5

The influence of raw material composition.

| Raw material | 1. Heavy gasoline | | 2. Gas oil Da | 3. DAV gas oil |
|---|---|---|---|---|
| Distilling curve °C. | Initial: | 148 | 200 | Initial: 285° C. |
| | 10% Vol. | 150 | 249 | Final: 514° C. |
| | 20% Vol. | 162 | 260 | Hydrofined |
| | 30% Vol. | 164 | 267 | at medium |
| | 40% Vol. | 166.5 | 274 | severity |
| | 50% Vol. | 168.5 | 282 | |
| | 60% Vol. | 170 | 292 | |
| | 80% Vol. | 173.5 | 315 | Characteristics |
| | 90% Vol. | 177.5 | 338 | after hydrofinin |
| | Final | 208 (95%) | | |
| Density($D_4^{20}$) | 0.781 | | 0.8600 | 0.8468 |
| Mean molecular mass | 131 | | 230 | 259 |
| Composition (% Vol) | Paraffins: 41.0 | | Paraffins + naphthenes 70% vol. Olefins 2% | Paraffins 55% vol Naphthenes: 27.5% vol. |
| | Naphthenes 44.5 | | | |
| | Aromatics: 14.5 | | Aromatics: | Aromatics: |

TABLE 5-continued

The influence of raw material composition.

| | | 28% Vol. | 17.5 vol. |
|---|---|---|---|
| Sulfur ppm | 340 | 1800 | 800 |
| Working conditions | | | |
| Hydrocarbons feed (hours$^{-1}$) | 2.6 | 3.8 | 2.6 |
| Ratio of steam to hydrocarbon | 0.97 | 1.18 | 0.90 |
| Product distribution | | | |
| $H_2$ | 0.86 | 0.81 | 0.60 |
| $CH_4$ | 10.24 | 6.15 | 11.57 |
| $C_2H_6$ | 2.36 | 2.51 | 6.80 |

| Raw material | 1. Heavy gasoline | 2. Gas Oil DA | 3. DAV gas oil |
|---|---|---|---|
| $C_2H_4$ | 27.50 | 17.01 | 16.90 |
| $C_3H_8$ | 0.52 | 0.56 | 1.04 |
| $C_3H_6$ | 15.49 | 13.59 | 16.14 |
| $C_4H_{10}$ | 0.31 | 0.12 | 0.16 |
| $C_4H_8$ | 7.19 | 7.28 | 6.68 |
| $C_4H_6$ | 4.68 | 2.78 | 3.07 |
| $C_5H_{12}$ | 0.19 | 0.42 | 0.12 |
| $C_5H_{10}$ | 2.63 | 4.50 | 1.30 |
| $C_5H_8$ | 2.50 | 2.27 | 1.10 |
| Gasoline 60-205° C. | 25.52 | 20.50 | 19.77 |
| Heavy cut 205-320° C. | 0 | 21.50 | 14.74 |
| Acetylene (ppm) | 850 | 700 | 780 |
| CO (% vol) | 0.91 | 0.85 | 0.90 |
| $C_3/C_2$ weight | 0.56 | 0.79 | 0.96 |
| TOTAL olefins $C_2-C_5$ | 59.99 | 47.43 | 45.19 |

EXAMPLE 5

In order to emphasize the influence of the diluent (water vapors) on the catalyst and unit of Example 2, experiments were carried in the presence and absence of water vapor. The results obtained are given in Table 6.

TABLE 6

The influence of raw material dilution with water vapors.

| Raw material Working conditions | Heavy gasoline (characteristics of table 5) | | | | n-Paraffins $C_9-C_{14}$ (Characteristics of table 4) | | | |
|---|---|---|---|---|---|---|---|---|
| | 1 | 2 | 3 | 4 | 5 | 6 | 7 | 8 |
| Water (1/1 cat. hour) | 0 | 0 | 0 | 1.3 | 0 | 0 | 0 | 2.9 |
| Hydrocarbon (1/1 cat.h) | 4.0 | 5.2 | 7.5 | 2.6 | 3.6 | 5.6 | 5.6 | 2.8 |
| Temperature °C. | 690 | 690 | 690 | 700 | 715 | 690 | 680 | 700 |
| Distribution of reaction products | | | | | | | | |
| $H_2$ | 1.05 | 0.54 | 0.48 | 0.70 | 3.52 | 1.37 | 0.47 | 1.02 |
| $CH_4$ | 14.11 | 9.62 | 8.57 | 8.14 | 14.84 | 11.75 | 6.65 | 6.75 |
| $C_2H_6$ | 5.75 | 5.00 | 4.48 | 3.10 | 11.61 | 10.62 | 7.24 | 2.44 |
| $C_2H_4$ | 21.25 | 17.81 | 15.64 | 17.27 | 26.00 | 26.91 | 22.48 | 19.47 |
| $C_3H_8$ | 0.93 | 0.88 | 0.77 | 0.55 | 1.68 | 2.07 | 1.65 | 0.65 |
| $C_3H_6$ | 17.35 | 18.17 | 15.06 | 13.24 | 20.20 | 22.13 | 20.31 | 13.16 |
| $C_4H_{10}$ | 0.24 | 0.23 | 0.19 | 0.42 | 0.39 | 0.56 | 0.41 | 0.23 |
| $C_4H_8$ | 6.17 | 6.29 | 5.50 | 4.60 | 6.50 | 6.86 | 6.01 | 7.48 |
| $C_4H_6$ | 4.82 | 4.75 | 4.63 | 4.35 | 5.86 | 4.52 | 4.81 | 5.39 |
| $C_5H_{12}$ | 0.05 | 0.04 | 0.03 | 0.48 | 0.16 | 0.21 | 0.39 | 0.22 |
| $C_5H_{10}$ | 3.34 | 3.03 | 2.60 | 3.50 | 4.75 | 2.36 | 3.10 | 4.10 |
| $C_5H_8$ | 2.04 | 2.03 | 1.98 | 2.13 | 3.29 | 3.02 | 2.77 | 2.08 |
| Gasoline 60-205° C. | 22.89 | 31.61 | 40.52 | 41.52 | 1.20 | 7.62 | 23.70 | 27.01 |
| $C_3/C_2$ | 0.82 | 1.02 | 0.96 | 0.77 | 0.78 | 0.82 | 0.90 | 0.68 |

TABLE 6-continued

The influence of raw material dilution with water vapors.

| Raw material Working conditions | Heavy gasoline (characteristics of table 5) | | | | n-Paraffins $C_9$—$C_{14}$ (Characteristics of table 4) | | | |
| --- | --- | --- | --- | --- | --- | --- | --- | --- |
| | 1 | 2 | 3 | 4 | 5 | 6 | 7 | 8 |
| (weight) Total olefins $C_2$-$C_5$ | 54.97 | 52.08 | 45.41 | 45.09 | 66.60 | 65.80 | 59.48 | 51.68 |

EXAMPLE 6

In order to emphasize pressure influence, experiments were carried on the catalyst and in the unit of Example 2 at different pressures with two types of raw materials. Table 7 shows the results.

TABLE 7

Pressure influence.

| Raw material Working conditions | n-Paraffins $C_9$-$C_{14}$ (characteristics of Table 4) | | | | DAV gas oil (Raw material 3 of Table 5) | | | |
| --- | --- | --- | --- | --- | --- | --- | --- | --- |
| | 1 | 2 | 3 | — | 1 | 2 | 3 | — |
| Hydrocarbons (hours$^{-1}$) | 2.8 | 2.8 | 5.6 | | 2.4 | 3.6 | 2.4 | |
| $H_2O$:HC(wt) | 1.48 | 1.45 | 1.48 | | 0.90 | 0.75 | 0.90 | |
| Temperature (°C.) | 690 | 690 | 690 | | 690 | 675 | 690 | |
| Outlet pressure (ate) | 5 | 10 | 10 | | 3.5 | 10.5 | 17.5 | |
| Distribution of products (% wt) | | | | | | | | |
| $H_2$ | 1.19 | 1.08 | 0.58 | | 0.31 | 0.26 | 0.97 | |
| $CH_4$ | 13.68 | 18.43 | 10.49 | | 13.79 | 10.13 | 17.94 | |
| $C_2H_6$ | 9.58 | 14.41 | 8.40 | | 7.21 | 6.98 | 11.10 | |
| $C_2H_4$ | 31.07 | 33.84 | 26.06 | | 12.65 | 10.75 | 14.82 | |
| $C_3H_6$ | 1.19 | 1.08 | 0.77 | | 1.23 | 1.37 | 1.31 | |
| $C_3H_8$ | 17.54 | 16.84 | 12.72 | | 12.07 | 9.61 | 11.58 | |
| $C_4$ cut | 13.10 | 6.33 | 5.19 | | 4.63 | 4.24 | 2.91 | |
| Gasoline 30-205° C. Cut | 12.65 | 7.99 | 38.26 | | 28.01 | 34.52 | 20.16 | |
| 205-360° C. | 0 | 0 | 0 | | 20.10 | 22.14 | 19.21 | |
| $C_3$-$C_2$ (wt) | 0.56 | 0.49 | 0.48 | | 0.95 | 1.06 | 0.78 | |

EXAMPLE 7

In order to emphasize temperature influence, experiments were carried on the catalyst and raw material of Example 2, at different temperatures. Results are given in Table 8.

TABLE 8

Temperature influence.

| Working conditions | 1 | 2 | 3 | 4 |
| --- | --- | --- | --- | --- |
| Hydrocarbon (hours$^{-1}$) | 2.8 | 2.8 | 2.8 | 3.0 |
| $H_2O$: Hydrocarbon (weight) | 3.0 | 2.9 | 2.8 | 2.0 |
| Temperature (°C.) | 650 | 680 | 705 | 725 |
| Distribution of products (% wt) | | | | |
| $H_2$ | 0.94 | 1.05 | 1.21 | 0.81 |
| $CH_4$ | 1.16 | 2.93 | 6.65 | 7.93 |
| $C_2H_6$ | 0.62 | 1.21 | 2.61 | 2.87 |
| $C_2H_4$ | 4.85 | 10.09 | 21.97 | 41.90 |
| $C_3H_6$ | 11.18 | 12.69 | 14.98 | 17.38 |
| $C_3H_8$ | 0.63 | 0.42 | 0.71 | 0.87 |
| $C_4$ cut | 9.46 | 11.54 | 14.11 | 12.81 |
| $C_5$ cut | 4.38 | 5.67 | 5.12 | 4.50 |
| Cut 60-205° C. | 66.78 | 54.40 | 32.64 | 10.93 |
| $C_3$: $C_2$ (wt) | 2.30 | 1.26 | 0.68 | 0.41 |
| TOTAL olefins $C_2$-$C_5$ | 29.87 | 39.99 | 56.18 | 76.59 |

I claim:

1. A catalyst for the pyrolysis of hydrocarbons which essentially consists of a modified crystalline aluminosilicate of the mordenite zeolite type of the formula: (yH.zM.uNa)O.Al$_2$O$_3$.nSIO$_2$ where y+z+u approximates or equals 2; n is a number greater than 20; and M is a metal selected from the group consisting of Cu, Ag or Co/2.

2. The catalyst according to claim 1 wherein said catalyst has from 0.005 to 0.50 wt.% of an oxide of a metal of large ionic radius deposited thereon wherein said metal or large ionic radius is selected from the group consisting of rare earth elements, lead and cerium.

3. The catalyst according to claim 1 admixed with a thermal heat carrier.

4. The catalyst according to claim 1 in particulate form suitable for mobile or fluid bed reactors.

5. The catalyst according to claim 1 wherein z is substantially 0.3.

* * * * *